July 14, 1931. E. A. OSMON 1,814,331
DIRECTION INDICATOR
Filed Jan. 10, 1931 2 Sheets-Sheet 1
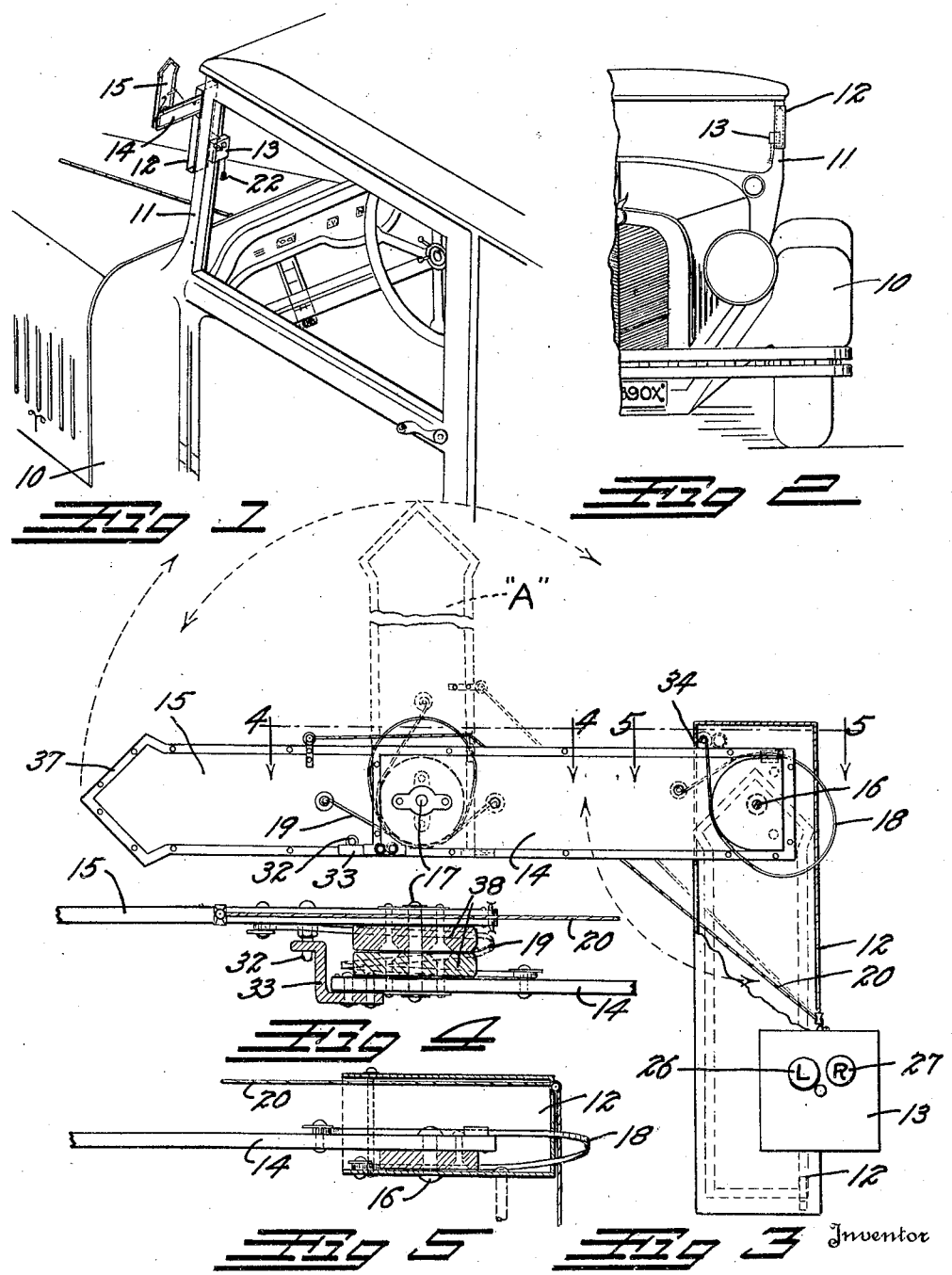
Inventor
ELMER A. OSMON
By
Attorney July 14, 1931.  E. A. OSMON  1,814,331
DIRECTION INDICATOR
Filed Jan. 10, 1931  2 Sheets-Sheet 2
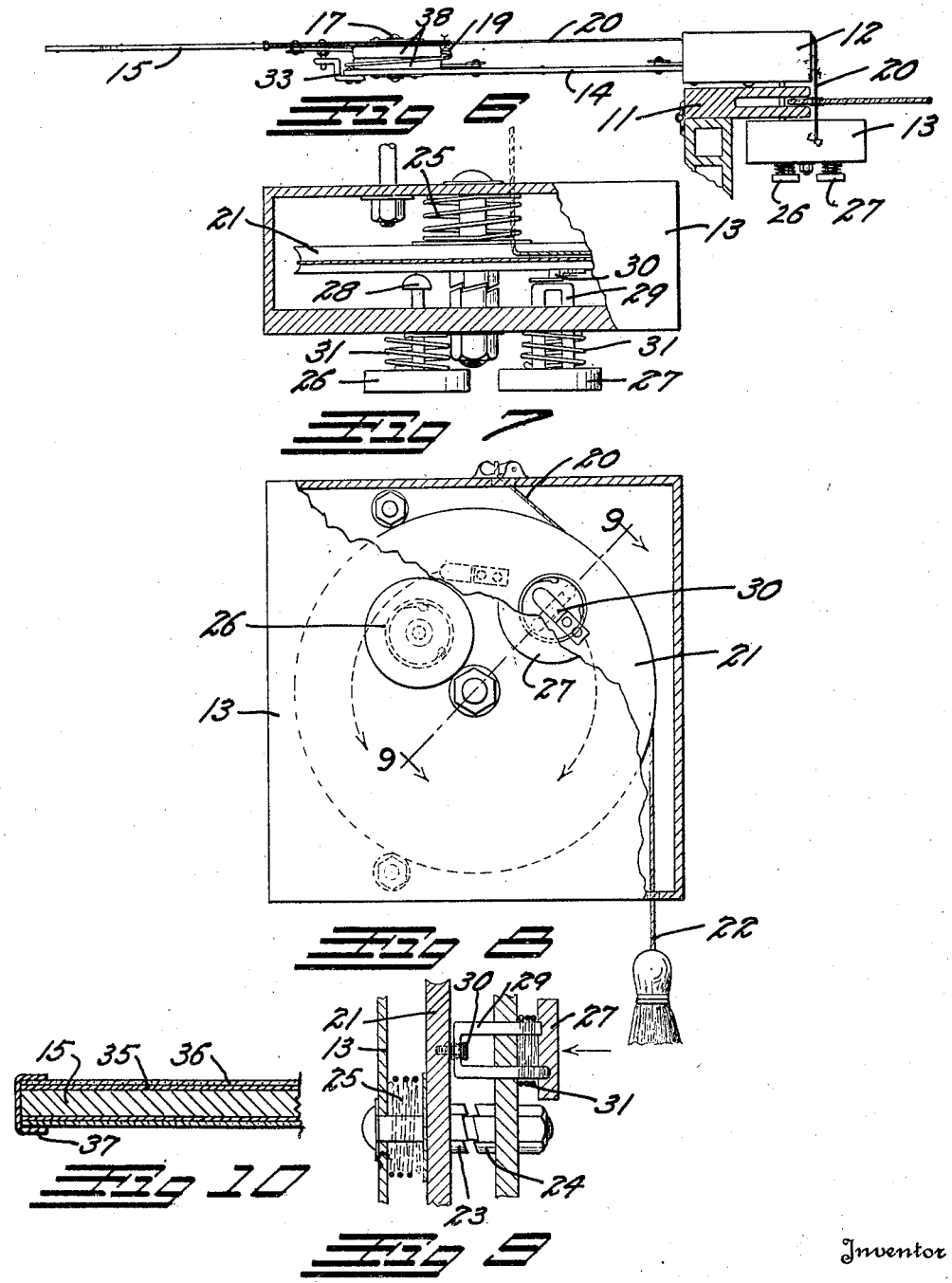

Patented July 14, 1931

1,814,331

UNITED STATES PATENT OFFICE

ELMER A. OSMON, OF DENVER, COLORADO

DIRECTION INDICATOR

Application filed January 10, 1931. Serial No. 507,859.

This invention relates to a direction indicator for automobiles and the like and has for its principal object the provision of an indicator which can be operated from the interior of a closed car; which will, with a single arm, instantly indicate either right or left turns; and which will be simple in construction yet positive and effective in operation.

Another object of the invention is to provide a direction indicator of the semaphore type which will be operable from push buttons to cause the semaphore arm to extend either straight out or outwardly and upwardly at a right angle, as desired.

A further object of the invention is to so construct the device that it can be quickly and easily reset.

A still further object of the invention is to provide a semaphore arm which will brilliantly reflect light in color so as to be conspicuously visible both day and night.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view illustrating the invention in place on an automobile.

Fig. 2 is a front view illustrating the invention in place.

Fig. 3 is a rear elevation of the invention showing, in solid line, the arm extended to indicate a left turn and, in broken line, to indicate a right turn.

Fig. 4 is a detail cross section taken on the line 4—4, Fig. 3.

Fig. 5 is a detail cross section taken on the line 5—5, Fig. 3.

Fig. 6 is a plan view of the invention.

Fig. 7 is a plan view of the control box with the top partially broken away to show the interior construction.

Fig. 8 is a front elevation of the control box with the front partially broken away to show the interior construction.

Fig. 9 is a detail section, illustrating the operation of the releasing ratchet. This section is taken on the line 9—9, Fig. 8.

Fig. 10 is an enlarged section of the semaphore arm illustrating details of its construction.

On the drawings a typical automobile is indicated at 10 with the left windshield post at 11. The invention is preferably designed to be attached to the windshield post 11. It can, however, be attached in any desired position.

The invention comprises an arm housing 12 and a control box 13. The housing 12 is secured on the front of the post 11 and the control box 13 upon the rear or interior thereof. The indicating or semaphore arm is formed of two arm members 14 and 15. The arm member 14 is pivoted at 16 within the housing 12. The arm member 15 is pivoted upon the extremity of the member 14 upon a suitable pivot pin 17 so that the two members can align with each other and extend outwardly as shown in Fig. 3. Spacer blocks 38 separate the two arm members at the pivot 17 so that they can fold upon each other so as to fit within the housing 12.

The arm member 14 is constantly urged upwardly toward the extended position by a spring 18. The arm member 15 is constantly urged toward the extended position by means of a second spring 19. The arm members are drawn into the housing and are held therein, by means of a cord or cable 20. The cable 20 passes into the control box 13 and coils about a spool 21 terminating in a pull cord 22.

It will be noted that as the arm members are drawn toward the housing, by pulling on the pull cord 22, the member 15 will first fold upwardly to the broken line position "A" and will then fold backwardly alongside of the member 14. When it has reached the latter position both members will be pulled into the housing 12.

The arm members are held in the housing by means of a ratchet 23 which is secured to the spool 21 and which engages a fixed ratchet 24 secured on the housing 12. The ratchets 23 and 24 are forced together by means of a compression spring 25. As the pull cord 22 is pulled the ratchet teeth will ride over each other so as to prevent the reverse rotation of the spool and the returning of the arm members to the extended position.

The release of the ratchets and the spool 21 is accomplished by means of two push buttons 26 and 27 marked "L" (for "left") and "R" (for "right"), respectively. The button 26 is arranged to force a contact plunger 28 against the spool 21 and the button 27 is arranged to force a U-shaped contact plunger 29 thereagainst. The U-shaped plunger 29 co-operates with a stop clip 30 upon the spool 21 to limit the reverse movement thereof to a predetermined fraction of revolution. Both buttons are constantly urged outwardly by means of button springs 31.

Let us assume that the driver desires to make a left turn and that the semaphore arm is within the housing 12, as shown in Fig. 2. He will press the button 26 causing the plunger 28 to push the spool 21 inwardly, against the action of the spring 25, until the two ratchets are released from each other. After the ratchets are released, the spool is rotated by the action of the arm springs 18 and 19 until both arm members 14 and 15 extends straight out, as shown in full line in Fig. 3. The member 15 is stopped in the "straight out" position by means of a stop pin 32 which engages a stop bracket 33 on the member 14. The member 14 is stopped in the aligned position by means of a closed top 34 on the casing 12. The arm now extends straight out and indicates that the driver intends to make a "left turn". After the turn has been completed the driver pulls upon the pull cord 22 to rotate the spool 21 and return the arm to its former position, within the housing 12.

In most States a "right turn" is indicated by extending the arm with the elbow bent so that the arm will project upwardly at right angles. The invention is so designed that it will simulate this signal. Let us assume that the driver desires to make a right turn. He pushes the push button 27 which causes the U-shaped plunger 29 to push the spool 21 inwardly so as to release the ratchets 23 and 24 so as to allow the spool to rotate as before. The stop clip 30 is so positioned, however, that, after a certain predetermined revolution of the pulley 21, it will strike and engage the U-shaped plunger 29. This stops the rotation of the spool at the time when the arm 14 has reached a horizontal position and the arm 15 has reached the vertical position "A" of Fig. 3. The indicator arm indicates that the driver intends to execute a "right turn".

It will be noted that after the clip 30 has engaged the plunger 29 the button 27 is held in the depressed position, as shown in Fig. 9. It remains in this position as long as the driver desires the "right turn" indication to appear. After the turn has been made he pulls upon the pull cord 22, causing the clip 30 to release the U-shaped plunger 29. This allows the button 27 to snap to its original position so that the arm can be pulled into the housing 12.

The arm members can be formed of any desired material. It has been found very desirable, however, to construct them with an external covering on both sides of light-reflecting material, such as tinfoil 35, and to cover this tinfoil with a layer of colored (preferably red) glass or celluloid or similar transparent material 36. The layers of material 35 and 36 are maintained in place on the arm by means of a metal edging 37.

It has been found that, with this construction, light will be brilliantly reflected by the tinfoil through the colored transparent material so as to produce a brilliant, conspicuous illumination throughout the entire length of the arm both day and night.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; and a flexible medium secured to the second arm member and arranged, when drawn upon, to first fold the second member on the first member and thence swing both said members to a vertical position.

2. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; a flexible medium secured to the second arm member and arranged, when drawn upon, to first fold the second member on the first member and thence swing both said members to a vertical position; a spool; said flexible medium being coiled about said spool; a ratchet for preventing said spool from rotating; and means for releasing said ratchet so as to allow said spring to uncoil said flexible medium.

3. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; a flexible medium secured to the second arm member and arranged, when drawn upon, to first fold the second member on the first member and thence swing both said members to a vertical position; a spool; said flexible medium being coiled about and secured to said spool; a ratchet for preventing unwinding rotation of said spool, said ratchet acting against the action of said arm springs; means for releasing said ratchet so as to allow said arm springs to uncoil said flexible medium; and means for stopping the said uncoiling at a predetermined point.

4. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; a flexible medium secured to the second arm member and arranged, when drawn upon, to first fold the second member on the first member and thence swing both said members to a vertical position; a spool, said flexible medium being coiled about and secured to said spool; a ratchet for preventing unwinding rotation of said spool, said ratchet acting against the action of said arm springs; means for releasing said ratchet so as to allow said arm springs to function, said means comprising: a manually operated member adapted to contact with said spool so as to force it from and release said ratchet.

5. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the second member; a flexible medium secured to the first arm member and arranged, when drawn upon, to first fold the second member on the first member and thence swing both said members to a vertical position; a spool; said flexible medium being coiled about and secured to said spool; a ratchet for preventing unwinding rotation of said spool, said ratchet acting against the action of said arm springs; means for releasing said ratchet so as to allow said arm springs to function; and a stop member adapted to stop the rotation of said spool at a point when said first arm member will be in a horizontal position and said second arm member will be in a vertical position.

6. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; a flexible medium secured to the second arm member and arranged, when drawn upon, to first fold the second member on the first member and thence swing both said members to a vertical position; a spool, said flexible medium being coiled about said spool; a pull cord depending from said spool so as to rotate the latter in one direction and draw said arms to their folded positions; a ratchet preventing return rotation of said spool; means for urging said spool toward said ratchet; and a manually operated release for pushing said spool away from said ratchet so as to release the latter and allow said arm springs to raise said arm members.

7. A direction indicator comprising: a first arm member pivoted at its one extremity to a supporting structure; a second arm member pivoted to the extremity of the first arm member; an arm spring for urging said first member to a horizontal position; a second arm spring for urging the second arm member to an aligned position with the first member; a flexible medium secured to the second arm member and arranged, when drawn upon, to first fold the second member on the first member and thence swing both said members to a vertical position; a spool, said flexible medium being coiled about said spool; a pull cord depending from said spool so as to rotate the latter in one direction and draw said arms to their folded positions; a ratchet preventing return rotation of said spool; a manually operated release for releasing said ratchet so as to allow said arm springs to raise said arm members; a second manually operated release; a plunger actuated by said second manually operated release adapted to release said ratchet; a stop member carried by said spool so as to engage said plunger and maintain it depressed after said spool has made a sufficient rotation to allow said first arm member to reach a horizontal position and said second arm member to reach a vertical position.

8. A direction indicator comprising: an open sided housing adapted to be secured to the exterior of an automobile; a first arm member pivoted within said housing; a first arm spring adapted to force said first arm member from said housing to a projecting horizontal position; a second arm member pivoted to the extremity of said first arm member; a second arm spring adapted to force said second arm member to an extended position aligned with said first arm member; a control box; a spool within said control box; a flexible medium extending from said spool to a connection with said second arm member; means for rotating said spool so as to wind said flexible medium within said control box so that it will first swing said second arm member upward and inward upon the second arm member and then will swing both said members downward within said housing; a ratchet for preventing reverse rotation of said spool; and means for releasing said ratchet.

9. A direction indicator comprising: an open sided housing adapted to be secured to the exterior of an automobile; a first arm member pivoted within said housing; a first arm spring adapted to force said first arm member from said housing to a projecting horizontal position; a second arm member pivoted to the extremity of said first arm member; a second arm spring adapted to force said second arm member to an extended position aligned with said first arm member; a control box; a spool within said control box; a flexible medium extending from said spool to a connection with said second arm member; means for rotating said spool so as to wind said flexible medium within said control box so that it will first swing said second arm member upward and inward upon the second arm member and then will swing both said members downward within said housing; a ratchet for preventing reverse rotation of said spool; a ratchet spring adapted to force said ratchet into action; a push button operatively connected through said control box so as to act against said ratchet spring to release said ratchet so as to allow said arm springs to function to extend said arms.

10. A direction indicator comprising: an open sided housing adapted to be secured to the exterior of an automobile; a first arm member pivoted within said housing; a first arm spring adapted to force said first arm member from said housing to a projecting horizontal position; a second arm member pivoted to the extremity of said first arm member; a second arm spring adapted to force said second arm member to an extended position aligned with said first arm member; a control box; a spool within said control box; a flexible medium extending from said spool to a connection with said second arm member; means for rotating said spool so as to wind said flexible medium within said control box so that it will first swing said second arm member to a position upon the second arm member and thence pull both said members within said housing; a ratchet for preventing reverse rotation of said spool; a ratchet spring adapted to force said ratchet into action; a push button operatively connected through said control box so as to act against said ratchet spring to release said ratchet so as to allow said arm springs to function to extend said arms and a stop carried by said spool so as to stop the rotation of the latter at a predetermined position.

11. A direction indicator comprising: a supporting structure; a first arm member; a first pivot between said supporting structure and said first arm member; a second arm member; a second pivot between the other extremity of the first arm member and one extremity of the said second arm member; a first arm spring for urging said first member to a horizontal position; a second arm spring for urging the second arm member to an aligned position with the first member; and a flexible medium secured to the second arm member and passing above said second pivot and below said first pivot so that, when drawn upon a predetermined distance, it will swing the second member upwardly on the first member and when drawn further, it will swing both said members downward to a vertical position.

12. A direction indicator comprising: a supporting structure; a first arm member; a first pivot between said supporting structure and said first arm member; a second arm member; a second pivot between the other extremity of the first arm member and one extremity of said second arm member; a first arm spring for urging said first member to a horizontal position; a second arm spring for urging the second arm member to an aligned position with the first member; and a flexible medium secured to the second arm member and passing above said second pivot and below said first pivot so that, when drawn upon a predetermined distance, it will swing the second member upwardly on the first member and when drawn further, it will swing both said members downwardly to a vertical position against the action of said arm springs; and means for stopping the return movement of said flexible medium at predetermined points so as to stop said arm members in desired positions.

In testimony whereof, I affix my signature.

ELMER A. OSMON.